Figure 1:
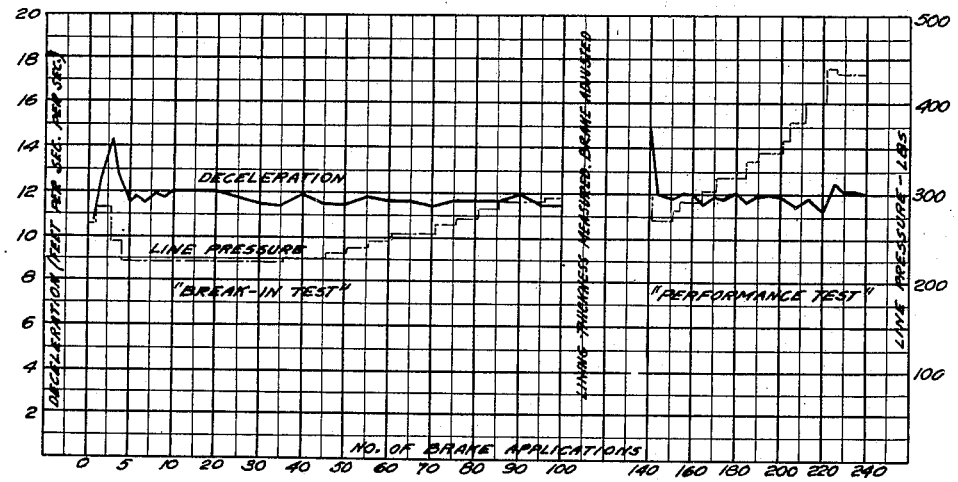

Sept. 23, 1941.  J. N. KUZMICK ET AL  2,256,646
MOLDED COMPOSITION FRICTION BODY
Filed Feb. 23, 1938  2 Sheets-Sheet 2

INVENTOR
JOSEPH N. KUZMICK
ALBERT WHITELAW
BY
ATTORNEY

Patented Sept. 23, 1941

2,256,646

UNITED STATES PATENT OFFICE 2,256,646

MOLDED COMPOSITION FRICTION BODY

Joseph N. Kuzmick, Clifton, and Albert Whitelaw, Passaic, N. J., assignors to Raybestos-Manhattan, Inc., Passaic, N. J., a corporation of New Jersey Application February 23, 1938, Serial No. 192,074

5 Claims. (Cl. 260—3)

This invention relates to the manufacture of molded composition brake linings and similar friction or tractive surface bodies, such as clutch facings, brake blocks, and the like, wherein asbestos fibers are bonded together with an organic bond such as rubber, synthetic resins, or oxidizable oils.

A number of processes are in commercial use for making molded composition friction bodies such as brake linings. Essentially these methods consist of combining relatively short fibre asbestos with various filling materials and an organic bond, followed by forming and curing (baking) the same to convert the organic bond to the infusible stage. These various prior art processes, regardless of their commercial importance, all have a serious limitation, in that the coefficient of friction of the molded body is not constant but undesirably changes with the degree of service imposed.

One prime object of our invention is to provide a way for efficiently predetermining the frictional coefficient of molded composition brake linings or similar friction articles. Another prime object is to produce a molded body of this character wherein the predetermined coefficient of friction can be constantly maintained under all operating conditions, such as changing temperatures and continuous service.

In the drawings, Figs. 1 to 4 are graphs depicting the advantages resulting from the use of our present invention.

Heretofore, frictional characteristics of brake linings and clutch facings have been determined by the use of inorganic fillers or by the use of organic modifiers. The use of inorganic fillers has not been entirely satisfactory inasmuch as their action in determining the frictional properties is relatively feeble unless very substantial amounts are used, in which case, however, there results rapid wear and poor strength. The use of inorganic fillers, no matter what proportions are utilized, does not overcome the limitation of very serious decline or even temporary total loss of frictional coefficient at the high temperatures incident to and resulting from high speed decelerations, this probably being caused by the breakdown or distillation of the organic binders. Organic modifiers in use are materials such as comminuted vulcanized rubber, various pitches and asphalts, for example gilsonite, etc. The objection to the use of rubber, pitches, and asphalts has been that they are only stable within a fairly narrow range of temperatures and have a tendency to smear or blanket the properties of the other compounded materials in the frictional element, resulting in erratic frictional coefficients, especially at the high temperatures induced by high speed deceleration.

We have discovered that the problem may be effectively solved by the addition to the composition of a modifier which is capable of inhibiting or compensating for this described loss of frictional coefficient with increased service temperatures, and by means of which, moreover, the coefficient of friction may be so stabilized that it remains constant under all conditions of service.

We have empirically found that certain reaction products of cashew nut shell liquid (hereafter designated as CNSL) dispersed in discrete particles throughout the mass of the friction body or composition, meets the stated ideal requirements. By discrete particles dispersed through the friction body, we mean that these particles are distinct or separate particles widely separated in the body mass. We have found it possible through the use of these CNSL reaction products to make friction materials having any of a variety of predetermined frictional coefficients, thus satisfying or meeting the individual demands for a high, medium, or low frictional coefficient, and to stabilize or maintain these predetermined values so that they remain constant under all conditions of service.

CNSL is the oil formed in the shell of the nut of the *Anacardium occidentale*. This oil consists essentially of anacardic acid

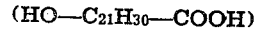

$$(HO-C_{21}H_{30}-COOH)$$

and cardol $(C_{32}H_{52}O_4)$. This CNSL exhibits some unusual characteristics, such as polymerization on heating in the presence of acid or alkaline catalysts, or under the influence of protracted heating even without a catalyst. It also forms condensation products with aldehydes. It is known that reaction or polymerization products of CNSL with heat, aldehydes, etc., give intermediate or end products varying from pourable molasses-like bodies, through a range of rubbery products, to products characterized by being hard, unyielding, and infusible. We find that the polymers or reaction products which can be characterized as being rubbery at normal temperatures are ideally suited for our purpose, especially since their heat resistance is far superior to the general type of organic bonds used in the manufacture of friction bodies. These rubbery products at room temperature are yielding but rather slow in recovery; that is, when compressed, their recovery to normal is rather slow.

On heating, however, the modulus of elasticity increases sharply with the increase in temperature, the product apparently reaching its maximum resilience at temperatures over 500° F. We believe that the unanticipated results obtained by us through the use of these CNSL modifiers are due to the increase in their modulus of elasticity with elevated temperatures. This counteracts or compensates for the loss of frictional coefficient due to such causes, as heat breakdown of bonds, etc.

The following is an example of some of the CNSL reaction products we have found suitable for our purpose:

We take by weight 100 parts raw CNSL, 4 parts sulphuric acid, concentrated, and 20 parts water. These materials are charged into a kettle equipped for stirring and heating. The materials are thoroughly mixed and heat is applied. The temperature may rise rapidly at first, but should not exceed 400° F. Heating is continued for 30 to 60 minutes at a temperature of 350° F. to 400° F. until the mass when cooled assumes the consistency of heavy molasses. At this point, the material may be charged into pans in layers of 1 to 2 inches in thickness and heated in suitable ovens at a temperature of 275° F. to 300° F. for 10 to 12 hours, or until the viscous material has polymerized into a solid, rubbery mass. When cold, this mass is comminuted by any convenient means to relatively coarse particles ranging from 20 to 100 mesh per inch in size.

As an alternative we may take the heavy molasses-like material of the above initial reaction and stir or knead the same in 10% of hexamethylenetetramine, heating this mixture in an oven at 275° F. for 3 to 4 hours to combine the free phenol groups with the methylene groups in the hexamethylenetetramine. The resulting rubbery mass is comminuted when cold to particles ranging from 20 to 100 mesh.

The comminuting in either case may be facilitated, if necessary, by previously chilling the rubbery masses with $CO_2$ ice.

We find that by comminuting the products, we may successfully use the cashew nut shell liquid products sold under the name, Cardolite Resin #655, and a comminuted resin called Cardolite #655 Dust.

The following is an example of a molded brake lining made in accordance with our invention using synthetic resin as the bond: we thoroughly mix in a tumbling barrel or two arm mixer 22 parts (by weight) of a potentially reactive synthetic resin such as a phenol-formaldehyde resin, 20 parts comminuted CNSL rubbery polymer, 30 to 100 mesh, known as Cardolite #655 Dust, 60 parts asbestos fibre, and 10 parts ground brake lining scrap. This mixture is molded under heat and pressure in known manner to the desired shape and size, the synthetic resin being converted to its infusible stage. The article is buffed or ground and is then ready for use. The CNSL polymer will be evident, that is to say, will be visibly distinct, in the finished article in the form of discrete particles throughout the mass. The CNSL polymer particles are insoluble in the bond and remain as discrete particles therein.

We may vary the proportions of asbestos fibre, organic bond, and CNSL polymers, depending upon the particular type of friction material and the particular coefficient of friction desired. An increase or decrease in the CNSL modifier changes the coefficient of friction in the same direction. We have found that 50% to 125% of CNSL modifier (by weight of the total bond) yields a range of coefficient of friction values to satisfy commercial demands.

The following is an example of a molded brake lining using rubber as a bond: We take, in parts by weight, 11 parts of crude rubber, soaked and digested in a solvent such as gasoline and then charged into a dough or two arm type mixer. Into this digested rubber are added: 7 parts comminuted rubbery CNSL polymer, 54 parts asbestos fibre, 4 parts graphite, 15 parts barium sulphate, 4 parts litharge, and 5 parts sulphur. After thoroughly mixing, this plastic mass may be extruded with a hydraulically operated ram through an orifice of the desired width and thickness in a continuous strip, which is subsequently vacuum dried to remove the solvent. After drying, the strip is compressed and vulcanized in a hydraulically operated platen press equipped for heating. The strips are then cut to desired length, buffed or ground to correct thickness, and are ready for use.

The tests now to be described will serve as an example of the advantages gained by the use of our present invention. Two sets of brake linings were tested on a standard inertia dynamometer, lining A being a standard commercial product containing comminuted vulcanized rubber as a modifying agent, and lining B being a duplicate of lining A except for the substitution of a comminuted rubbery CNSL polymer as described herein for or in place of the comminuted rubber. The substitution is on a direct volume basis, the binder, asbestos fibre, etc., remaining constant.

Figure 2:
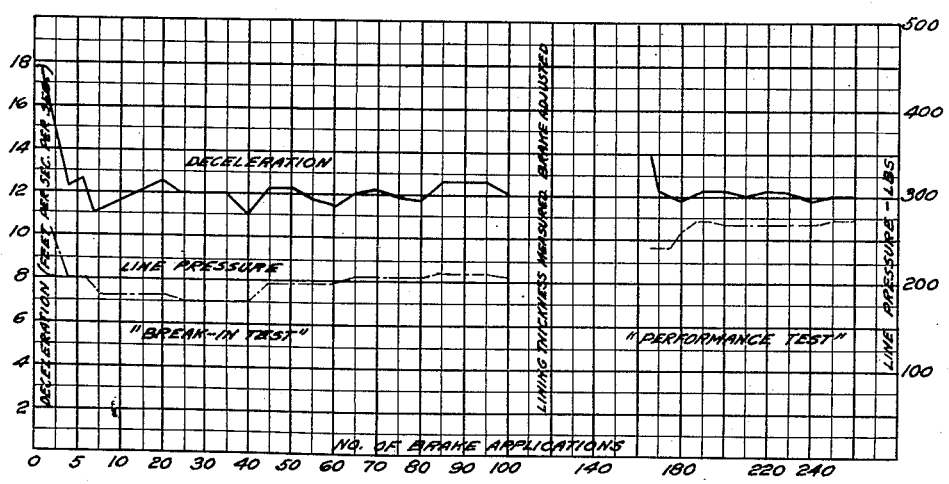

As illustrated by the graphs of Figs. 1 and 2, which represent respectively the performances of linings A and B, both linings are first broken in, by running 100 stops at 1 minute intervals to insure proper contact. The initial speed for these breaking-in tests is 30 miles per hour and the tests are carried out, by controlling the line pressure, to produce a deceleration of 12 feet per second per second. Each lining is then given a "performance test" of 500 stops at 2 minute intervals, the initial speed for each of these tests being 40 miles per hour and the tests being carried out to produce the same deceleration of 12 feet per second per second, this latter being accomplished by controlling the line pressure.

With these latter tests made at 2 minute intervals, the temperatures of the linings progressively rise. The right hand graph of lining A (Fig. 1) shows the progressive increase in line pressure from 275 pounds to 430 pounds required to maintain the constant high speed deceleration of 12 feet per second per second, whereas the corresponding graph of lining B (Fig. 2) shows that a substantially constant line pressure of 240 to 270 pounds may be applied to maintain the same constant deceleration of 12 feet per second per second. These comparative tests, therefore, demonstrate that with the use of our invention, the following important advantages are achieved: (1) The loss of the coefficient of friction incident to increasing temperatures (shown by the need in Fig. 1 for the progressive increase of line pressure to maintain constant deceleration) is entirely inhibited or compensated for, (2) a resultant coefficient of friction is obtained which is constant under continuous conditions of service, and (3) a substantially lower line pressure is needed or suffices for accomplishing a high speed deceleration (at all temperatures).

Figure 3:
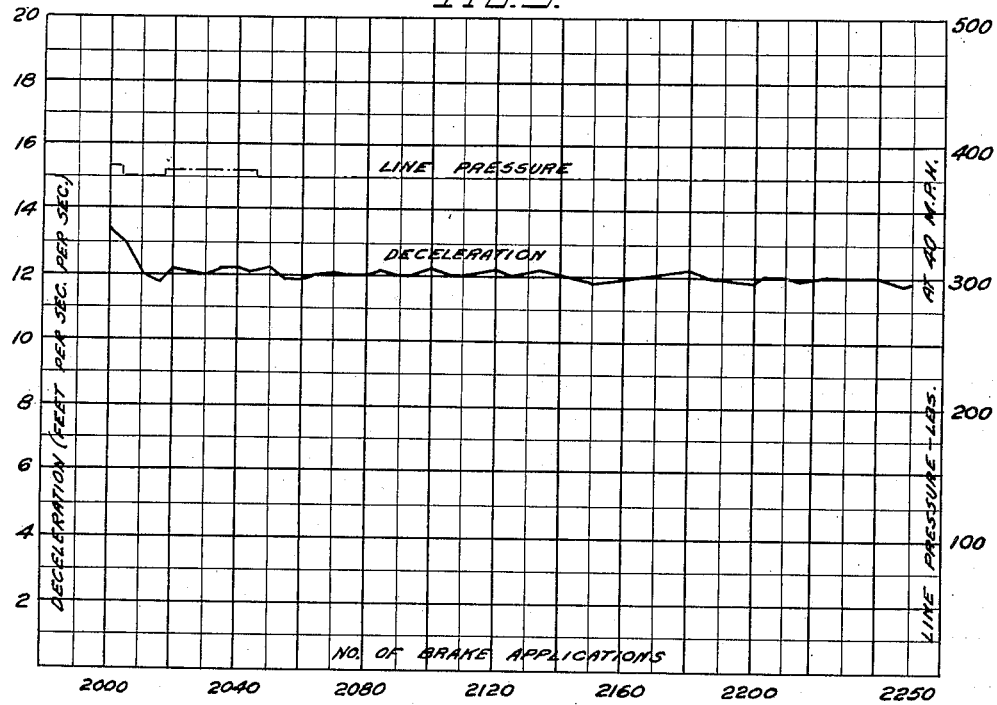
Figure 4:
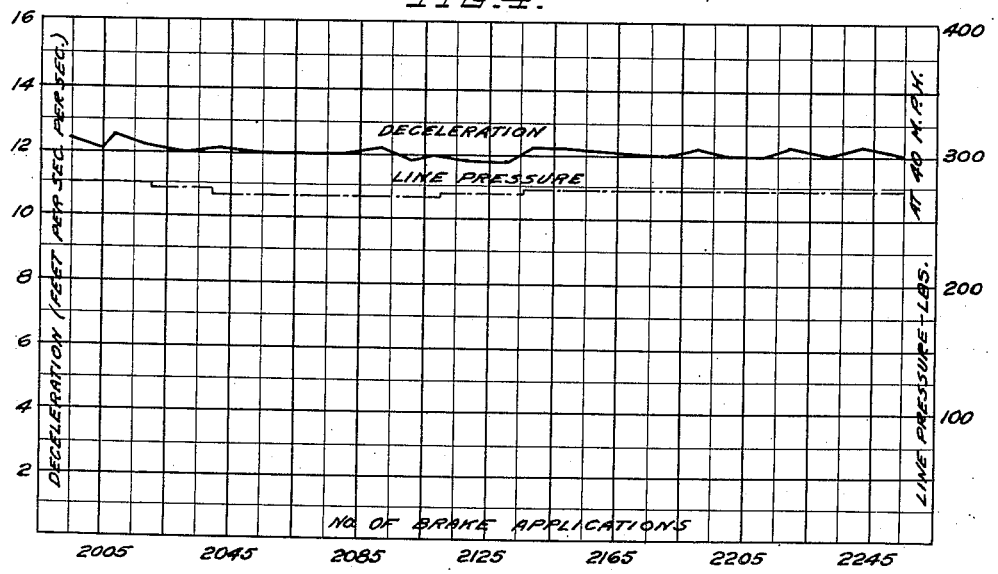

A comparison of the graphs of Figs. 3 and 4 shows the increased frictional coefficient of lining B. The tests of Figs. 3 and 4 are carried out over a series of brake applications or stops at long intervals; these graphs, therefore, depict the results achieved in the substantial absence of any rising temperatures. Fig. 3 shows that lining A requires a line pressure of 375 pounds for a 12 foot per second per second deceleration starting with an initial speed of 40 miles per hour, while Fig. 4 shows that the lining B only requires a line pressure of 270 pounds to effect the same high speed deceleration. These comparative tests, therefore, demonstrate that even at the lower or constant temperatures, the linings made in accordance with our invention possess a substantially higher frictional coefficient and require a substantially lower line pressure to accomplish the same high speed deceleration.

The manufacture of molded composition friction bodies embodying the principles of our present invention and the important advantages secured thereby will be apparent from the above detailed description thereof. While we have given certain specific examples of carrying out the method of the invention and producing the products thereof, it will be understood that these examples may be varied within wide limits without departing from the essence or spirit of the invention.

We do not wish to limit ourselves to particular organic bonds or methods of making the bodies. Inasmuch as the herein described CNSL rubbery reaction products are insoluble in most organic solvents, they can be introduced into mixtures made by the wet, dry, or solvent methods, remaining in the mix and subsequent finished product as a distinct separate component (discrete particles) of the mass. The reaction product of the Marking nut oil may be used as an equivalent to that of the cashew nut shell liquid. Instead of phenol-formaldehyde synthetic resins there may be used phenol-furfural resins, modified alkyd resins, cresol-siccatine oil modified resins or combinations thereof.

We claim:

1. A molded composition friction or tractive surface body such as a brake lining or clutch facing, comprising fibres bonded with an organic bond and containing as a distinct component of the body mass widely separated discrete rubbery coarse particles dispersed through the body mass, said discrete rubbery particles being insoluble in said bond, visibly distinct therein and consisting of a reaction or polymerization product of an anacardic acid material.

2. A molded composition friction or tractive surface body such as a brake lining or clutch facing, comprising fibres bonded with an organic bond and containing as a distinct component of the body mass widely separated discrete rubbery coarse particles dispersed through the body mass, said discrete rubbery particles being insoluble in said bond, visibly distinct therein and consisting of a cashew nut shell liquid reaction or polymerization product.

3. A molded composition friction or tractive surface body such as a brake lining or clutch facing, comprising asbestos fibres bonded with an organic bond and containing as a distinct component of the body mass widely separated discrete rubbery particles of from 20 to 100 mesh dispersed through the body mass, said discrete rubbery particles being insoluble in said bond, visibly distinct therein and consisting of a reaction or polymerization product of an anacardic acid material.

4. A molded composition friction or tractive surface body such as a brake lining or clutch facing, comprising fibres bonded with a synthetic resin bond and containing as a distinct component of the body mass widely separated discrete rubbery coarse particles dispersed through the body mass, said discrete rubbery particles being insoluble in said synthetic resin bond, visibly distinct therein and consisting of a reaction or polymerization product of an anacardic acid material.

5. A molded composition friction or tractive surface body such as a brake lining or clutch facing, comprising fibres bonded with a rubber bond and containing as a distinct component of the body mass widely separated discrete rubbery coarse particles dispersed through the body mass, said discrete rubbery particles being insoluble in said rubber bond, visibly distinct therein and consisting of a reaction or polymerization product of an anacardic acid material.

JOSEPH N. KUZMICK.
ALBERT WHITELAW.